US012759099B2

(12) United States Patent
Chen

(10) Patent No.: US 12,759,099 B2
(45) Date of Patent: Oct. 13, 2026

(54) METHOD OF MANUFACTURING INTEGRALLY FORGED BIKE SUSPENSION FORK

(71) Applicant: ALEX GLOBAL TECHNOLOGY, INC., Tainan City (TW)

(72) Inventor: Wei-Chin Chen, Tainan City (TW)

(73) Assignee: Alex Global Technology, Inc., Tainan City (TW)

( * ) Notice: Subject to any disclaimer, the term of this patent is extended or adjusted under 35 U.S.C. 154(b) by 405 days.

(21) Appl. No.: 18/509,644

(22) Filed: Nov. 15, 2023

(65) Prior Publication Data

US 2025/0153286 A1 May 15, 2025

(51) Int. Cl.
*B62K 21/02* (2006.01)
*B23P 15/00* (2006.01)

(52) U.S. Cl.
CPC .............. *B23P 15/00* (2013.01); *B62K 21/02* (2013.01)

(58) Field of Classification Search
CPC ................................. B23P 15/00; B62K 21/02
See application file for complete search history.

(56) References Cited

U.S. PATENT DOCUMENTS

2010/0230926 A1* 9/2010 Dodman ................ B21D 53/86 72/356

FOREIGN PATENT DOCUMENTS

TW I803442 B 5/2023

* cited by examiner

*Primary Examiner* — Jason L Vaughan
*Assistant Examiner* — Amanda Kreiling
(74) *Attorney, Agent, or Firm* — Rosenberg, Klein & Lee

(57) ABSTRACT

A method of manufacturing integrally forged bike suspension forks is provided. First initially forming a crown prototype by forging of an aluminum ingot. The crown prototype includes two lateral shoulders and a solid protuberant base. By deep drawing, the solid protuberant base and the lateral shoulders are respectively drawn and extended to form a front fork section and suspension tube sections. By milling, a top surface of each of the lateral shoulders is milled to communicate with the suspension tube section. Thereby an integrally-forged suspension fork is obtained. Therefore, the aluminum ingot is processed to obtain the integrally formed suspension front fork with the suspension tube sections and the front fork section. The suspension front fork is having high strength and shock resistance under impact of an external force applied to a front wheel of the bike.

5 Claims, 9 Drawing Sheets

METHOD OF MANUFACTURING INTEGRALLY FORGED BIKE SUSPENSION FORK

BACKGROUND OF THE INVENTION

Field of the Invention

The present invention relates to a method of manufacturing integrally forged bike suspension forks, especially to a method of manufacturing integrally forged bike suspension forks each of which includes a front fork section and suspension tube sections.

Description of Related Art

No matter high level bikes for mounting or racing or low level bikes for entertainment are provided with suspension mechanisms for higher safety. The suspension mechanism can be mounted to a front wheel, a rear wheel, or other positions (such as seatpost or handlebar) to absorb or reduce external force from outside. Thus the bikes have impact-buffering performance and shock absorption.

The bikes are designed to have various functions in order to meet requirements for different purposes. For example, the suspension mechanism is disposed on a fork to form a suspension fork. Generally, the suspension fork includes a steer tube, a bridge-shaped crown connected with a rear end of the steer tube at a middle part, two sliders connected to two ends of the fork crown correspondingly, and dampers mounted in a rear part of the sliders correspondingly. Refer to Taiwanese Pat. Pub. No. 1803442, a bicycle fork set is provided. The steer tube is connected with a mounting hole of the crown by an expanded large-diameter part. The steer tube and the mounting hole are connected by tight fit. Moreover, the crown is provided with two arms (shoulders) each of which includes an assembly hole for connection with the corresponding slider. While riding the bicycle, the fork is compressed when the front wheel is running over a bumpy road. Then the slider is moved downward along an outer tube and the bumpers absorb vibrations. The bridge-shaped crown with arms not only has torsional movement but also receives forces from dampers or generated while riders press the handlebar downward. Thus multiple external forces are applied to this area. Yet the steer tube is connected with the bridge-shaped crown by insertion. Thereby deformation or breakage problem is easy to occur once the strength of the area is insufficient and this threatens safety of the riders.

Thus there is room for improvement and there is a need to provide a method of manufacturing integrally forged bike suspension forks which is more practical.

SUMMARY OF THE INVENTION

Therefore, it is a primary object of the present invention to provide a method of manufacturing integrally forged bike suspension forks each of which includes a front fork section and suspension tube sections.

In order to achieve the above object, a method of manufacturing integrally forged bike suspension forks according to the present invention mainly includes the following steps. First providing an aluminum ingot as a base material and initially forming a crown prototype by forging of the base material. The crown prototype includes two lateral shoulders and a solid protuberant base. By deep drawing, the solid protuberant base and the lateral shoulders are respectively drawn and extended to form a front fork section and suspension tube sections. Then a top surface of each of the lateral shoulders is milled to communicate with the corresponding suspension tube section by milling. Thereby an integrally-forged suspension fork is obtained. Therefore, the aluminum ingot is processed to obtain the integrally formed suspension front fork with the front fork section and the suspension tube sections. The suspension front fork is having high strength and shock resistance under impact of an external force applied to a front wheel of the bike.

Preferably, the method further includes a step of reaming. Perform reaming on an open end of each of the suspension tube sections for increasing a tube diameter and convenient installation of dampers.

Preferably, perform reinforcement processing on a concave portion of the protuberant base after the step of initially forging a prototype. Thus a reinforcement rib is formed on the concave portion by forging.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, features, and functions of the present invention more clearly and completely, please refer to the following embodiments with related figures and reference signs.

Figure 1:
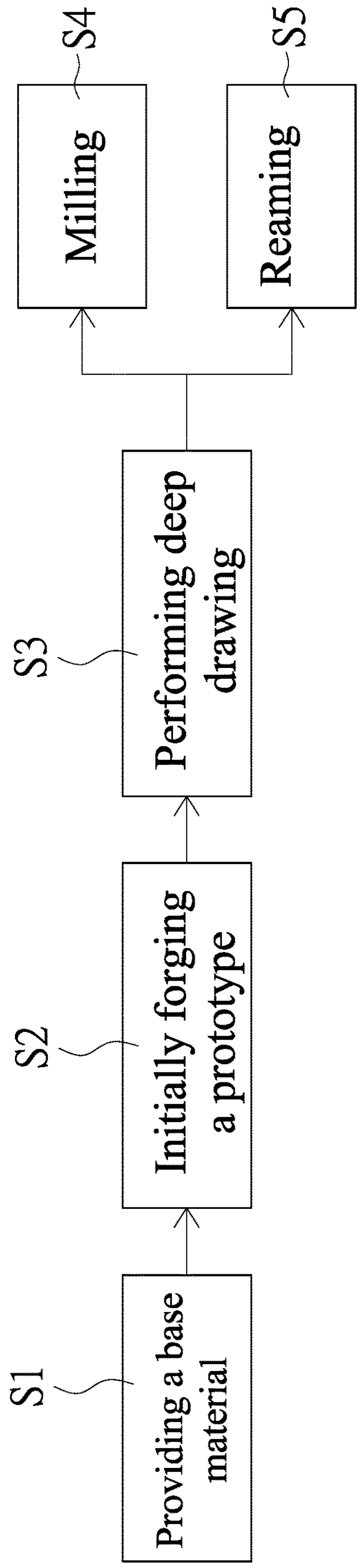
FIG. 1 is a bock diagram showing steps of an embodiment according to the present invention.
Figure 2:
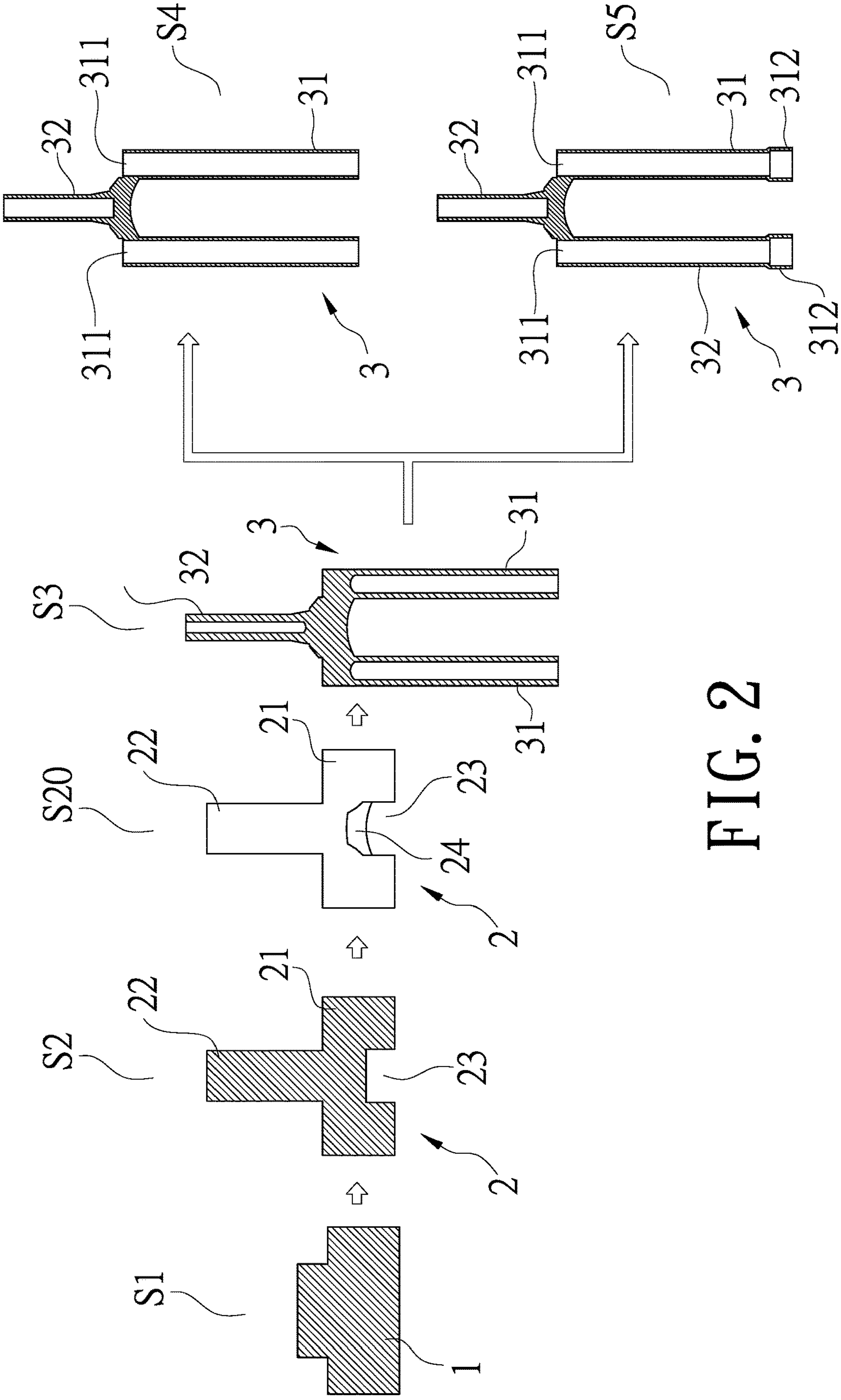
FIG. 2 is a schematic drawing showing a flow chart of an embodiment according to the present invention.
Figure 3:
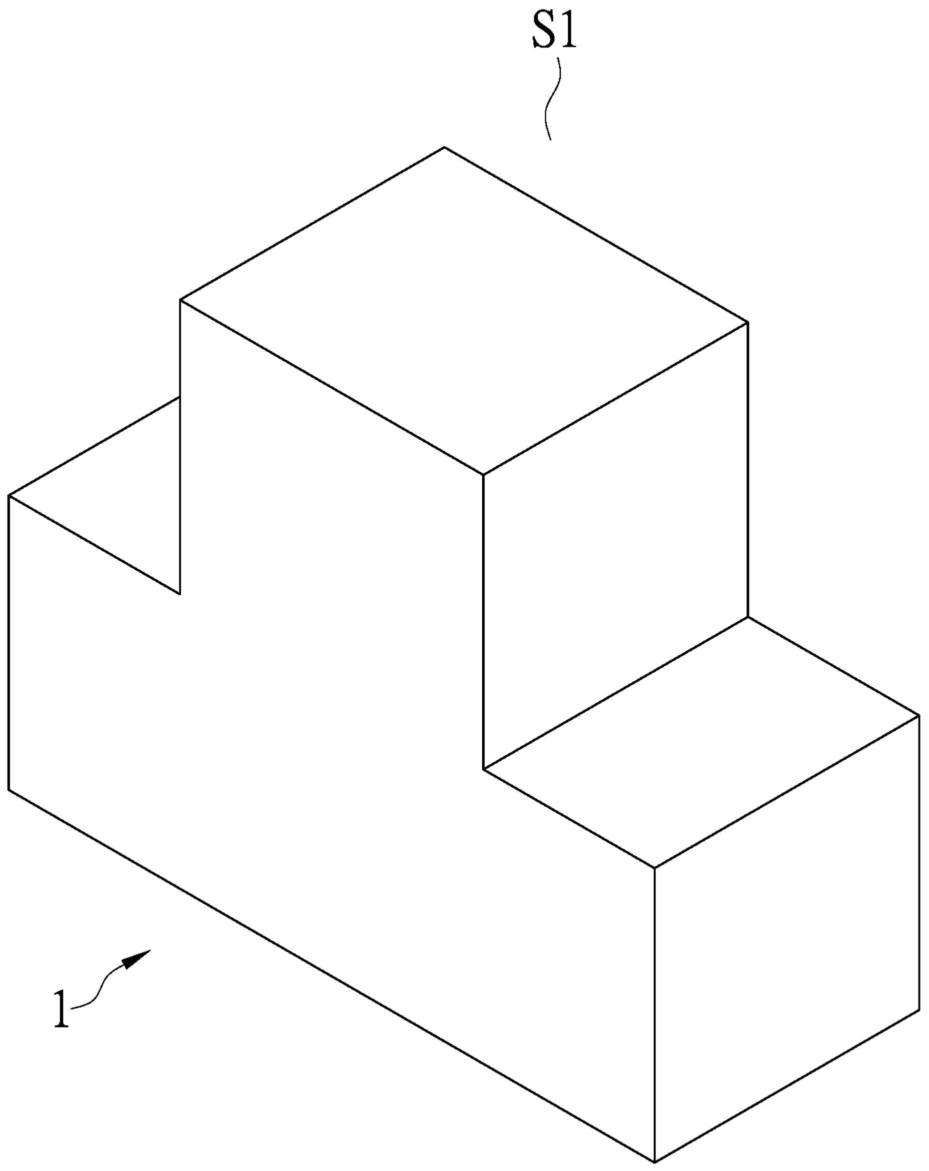
FIG. 3 is a schematic drawing showing an aluminum ingot of an embodiment according to the present invention.

Refer to FIG. 1 and FIG. 2, a method of manufacturing integrally forged bike suspension forks includes the following steps.

S1: providing a base material. Selecting an aluminum ingot used as a base material 1.

S2: initially forging a prototype. Initially form a crown prototype 2 by forging of the base material 1. The crown prototype 2 is composed of two lateral shoulders 21, a solid protuberant base 22 located between the two lateral shoulders 21 and extending upward, and a concave portion 23 on a bottom surface between the two lateral shoulders 21.

S3: performing deep drawing. The two lateral shoulders 21 and the solid protuberant base 22 are processed by deep drawing at the same time. Bottom surfaces of the two lateral shoulders 21 are drawn down vertically and extended to form suspension tube sections 31 while a top end of the solid protuberant base 22 is drawn upward vertically and extended to form a front fork section 32. Thereby an integrally forged suspension front fork 3 is obtained.

Before installation of dampers, the two lateral shoulders 21 are applied with step S4: milling. Perform milling on top surfaces of the two lateral shoulders 21 corresponding to the suspension tube sections 31 for communicating with the suspension tube sections 31 and mounting of the dampers. Then perform step S5: reaming on an open end of each of the suspension tube section 31 for increasing a tube diameter and convenient installation of the dampers.

Figure 4:
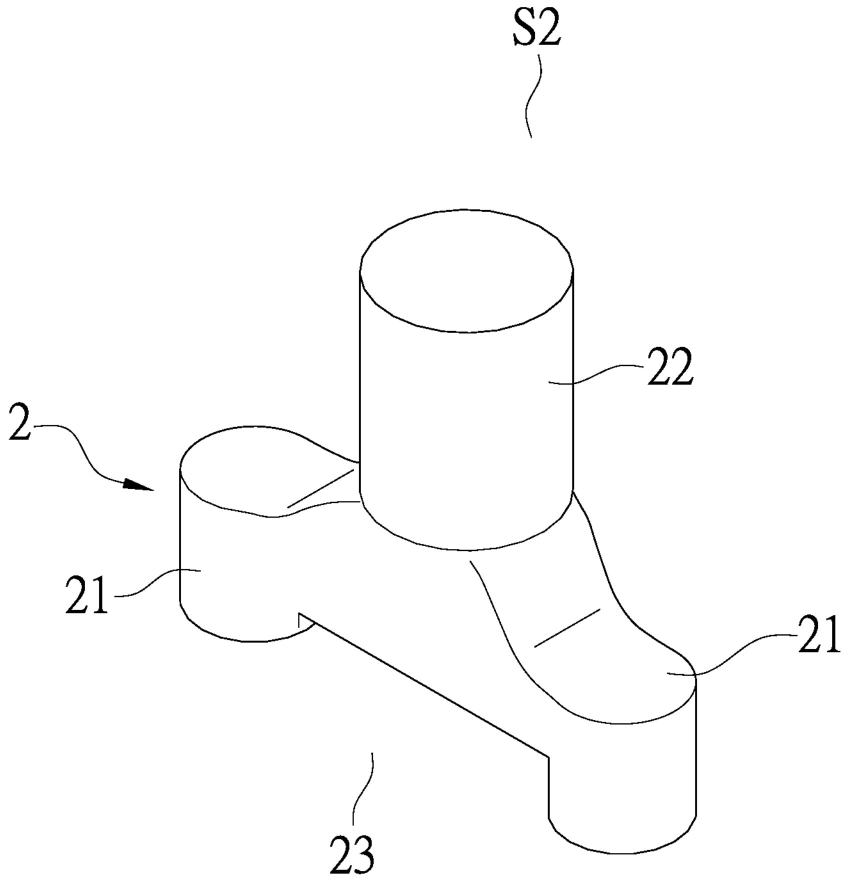
FIG. 4 is a schematic drawing showing a forged prototype of an embodiment according to the present invention.

As shown in FIG. 1-8, while being implemented, first run the step S1; providing a base material 1 which is an aluminum ingot. The aluminum ingot is made of aluminum alloy with advantages of light weight, good strength, etc. Generally, the aluminum alloy includes silicon (Si), copper (Cu), magnesium (Mg), iron (Fe), nickel (Ni), manganese (Mn), zinc (Zn), chromium (Cr), titanium (Ti), etc., which is/are selected according to performance and properties required. The aluminum ingot used as the base material 1 is as shown in the figures. Then perform the step S2 initially forging a prototype to the base material 1. The base material 1 is forged to initially form a crown prototype 2 which includes two lateral shoulders 21, a solid protuberant base 22 located between the two lateral shoulders 21 and extending upward, and a concave portion 23 on a bottom surface between the two lateral shoulders 21 (as shown in FIG. 4).

Figure 5:
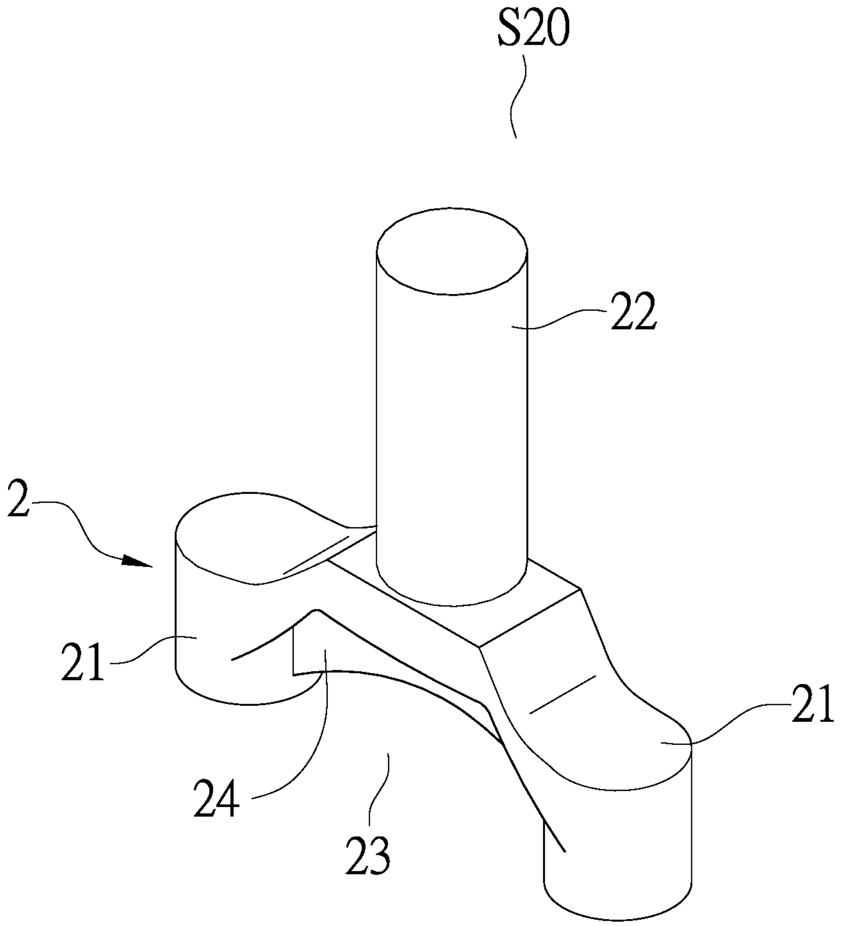
FIG. 5 is a schematic drawing showing reinforcement processing of an embodiment according to the present invention.
Figure 6:
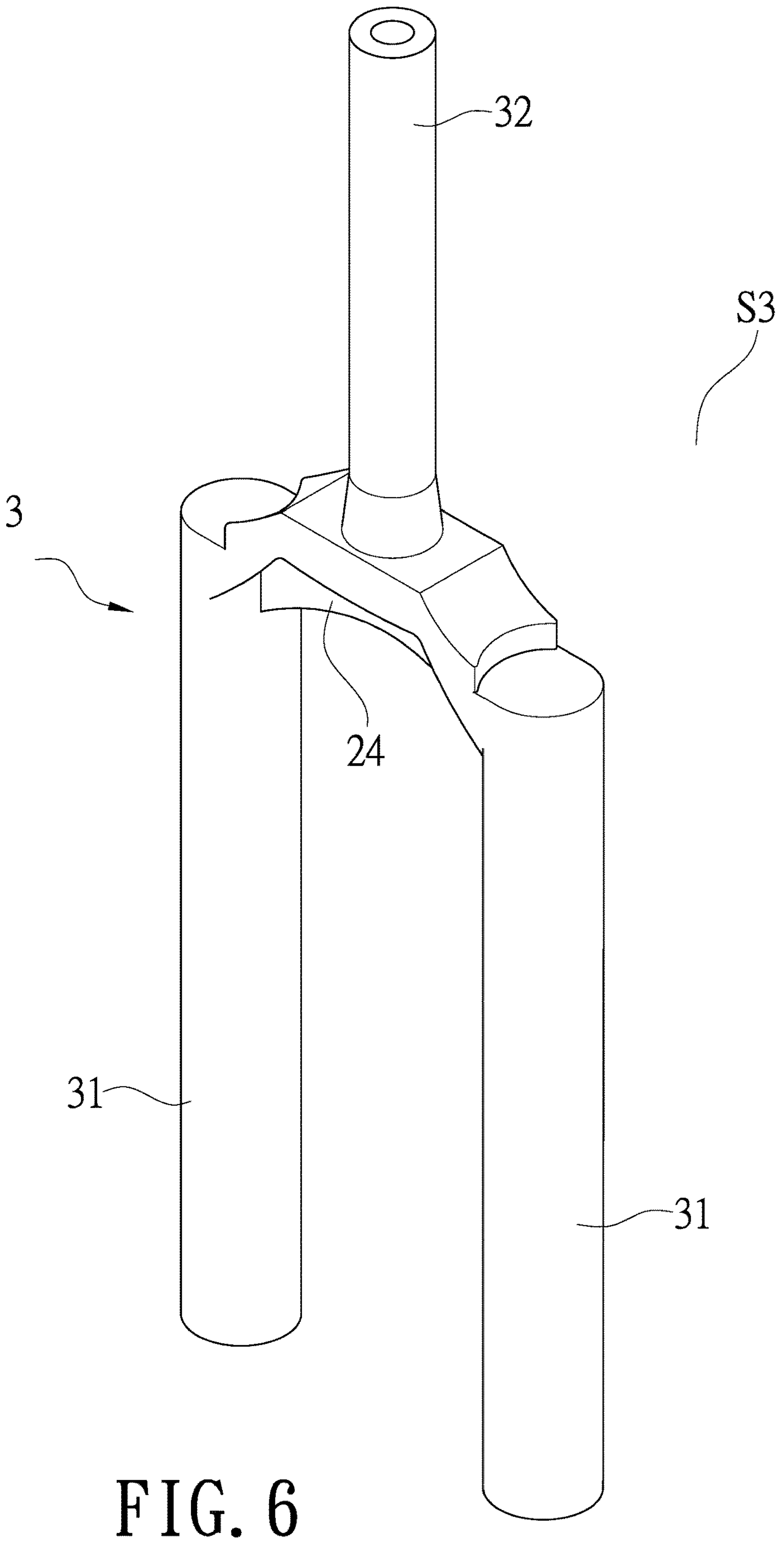
FIG. 6 is a schematic drawing showing deep drawing of a suspension fork of an embodiment according to the present invention.
Figure 7:
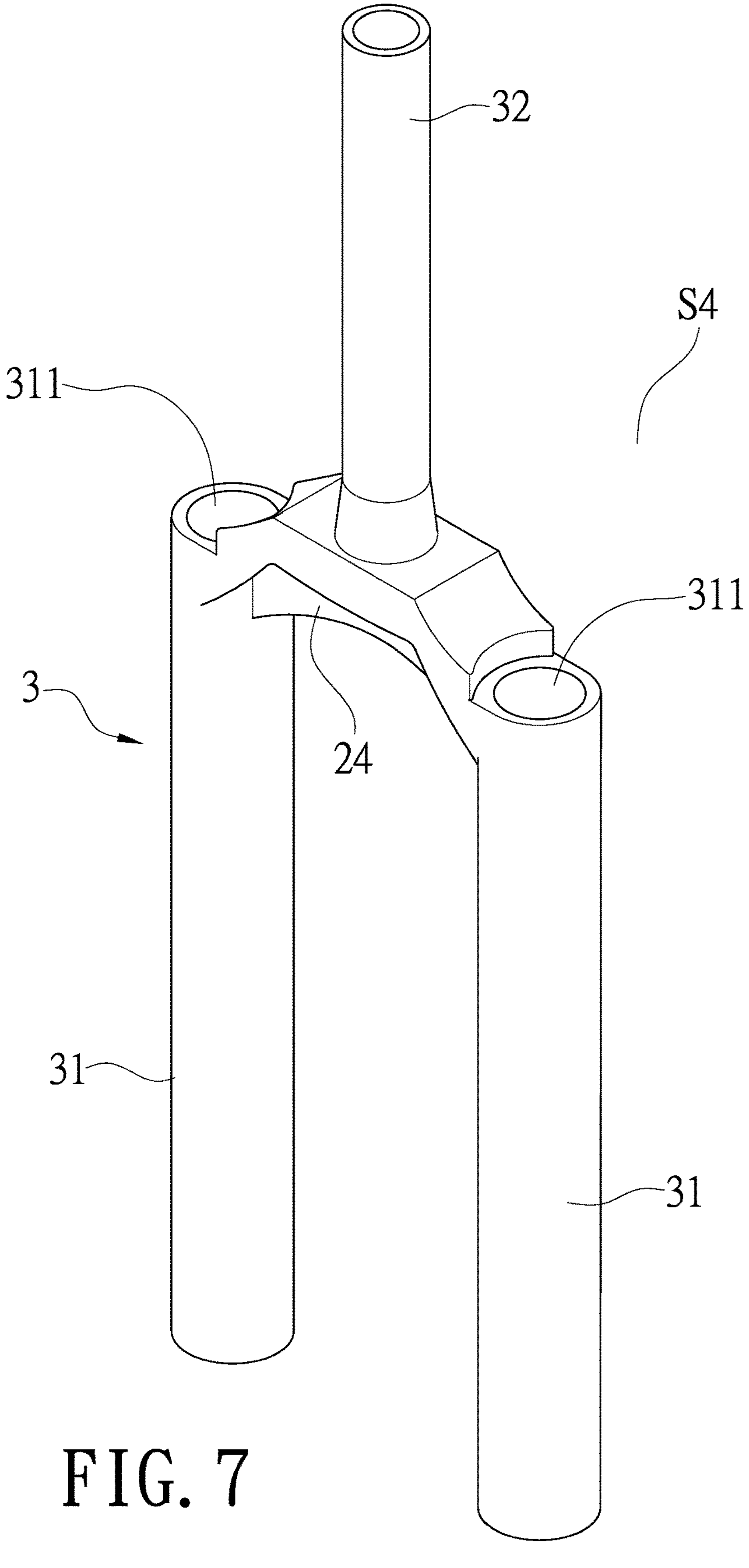
FIG. 7 is a schematic drawing showing milling operation of an embodiment according to the present invention.
Figure 8:
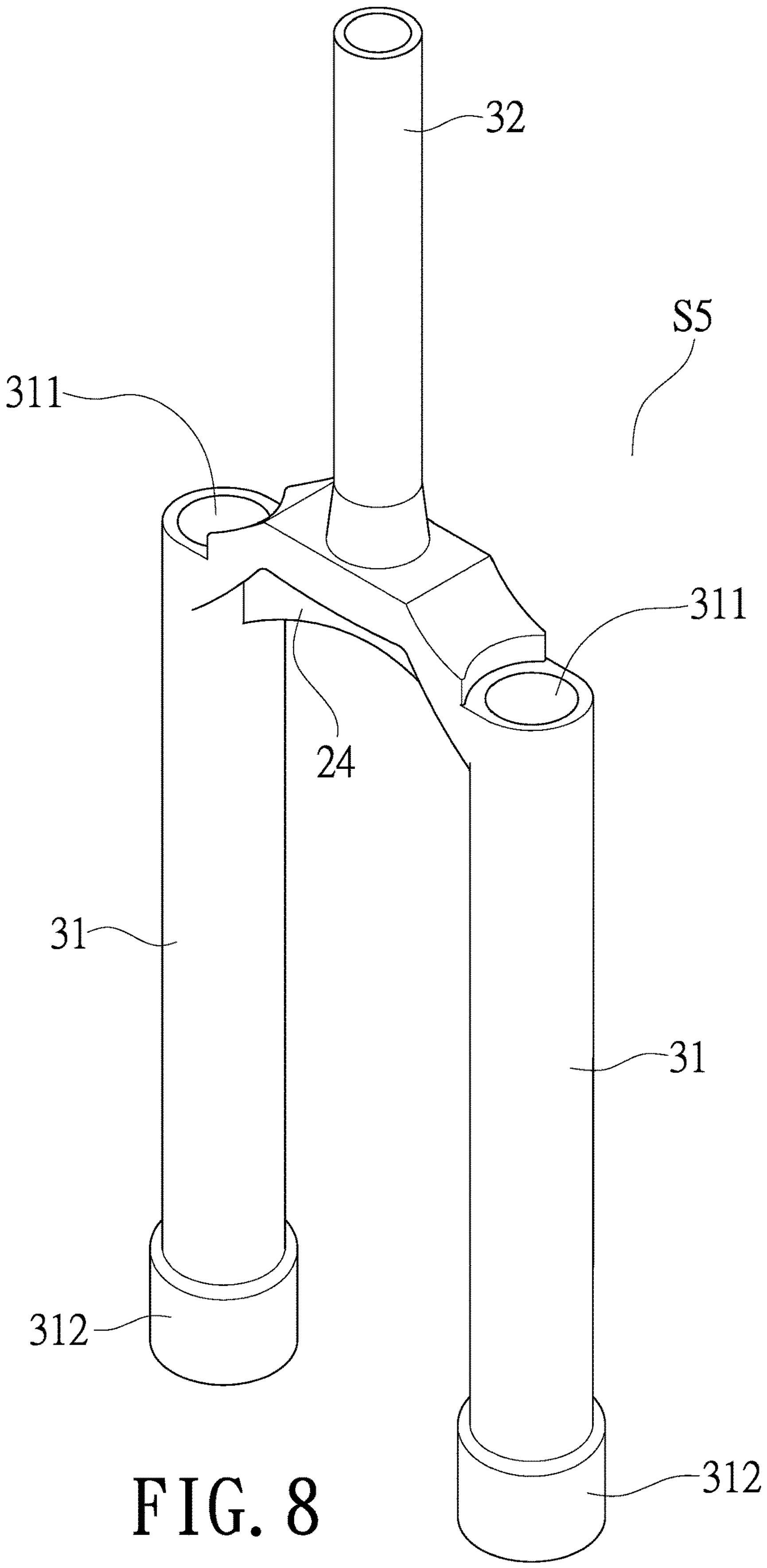
FIG. 8 is a schematic drawing showing reaming operation of an embodiment according to the present invention.
Figure 9:
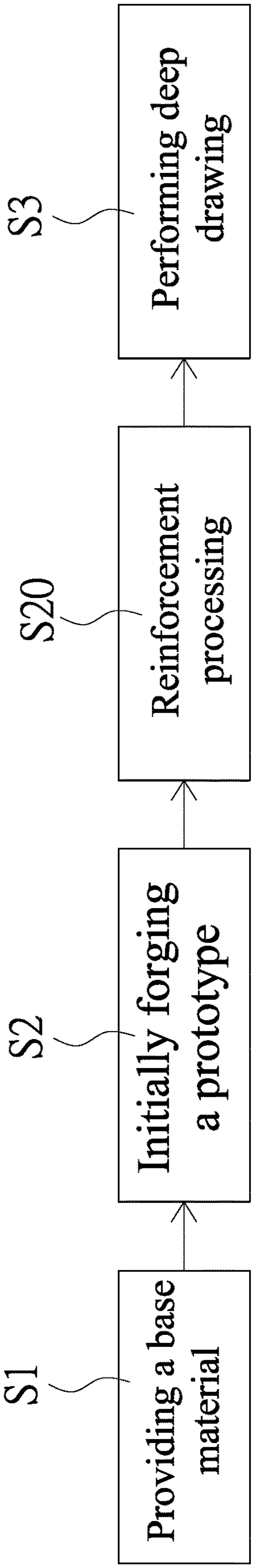
FIG. 9 is a bock diagram showing steps including a step of reinforcement processing of an embodiment according to the present invention.

Moreover, in consideration of overall strength of the suspension fork, the lateral shoulders 21 are further treated by a step S20 reinforcement processing after initially forging the prototype of the step S2. That means performing reinforcement processing on the concave portion 23 between the two lateral shoulders 21 to form a reinforcement rib 24 on the concave portion 23 by forging (as shown in FIG. 2, FIG. 5, and FIG. 9). Then perform the step S3 deep drawing on the crown prototype 2. The two lateral shoulders 21 and the solid protuberant base 22 are processed by deep drawing with dies and external forces applied at the same time. The base material 1 of the lateral shoulders 21 is drawn down vertically and extended from the bottom surfaces of the two lateral shoulders 21 to form the suspension tube sections 31. At the same time, the base material 1 of the solid protuberant base 22 is drawn upward vertically and extended from the top end of the solid protuberant base 22 to form the front fork section 32 (as shown in FIG. 6). Next run the step S4 milling. The top surface of each of the two lateral shoulders 21 corresponding to the suspension tube section 31 is milled to get an assembly hole 311 (an insertion hole is formed by milling first and then is processed to be the assembly hole with threads) and make the assembly hole 311 communicate with the suspension tube section 31 (as shown in FIG. 7). Also carry out the step S5 reaming. Perform the reaming operation on the open end of the suspension tube section 31 to increase the tube diameter. After milling and reaming operations of the suspension tube section 31, assembly of the dampers is easy and convenient, as shown in FIG. 8. As to the front fork section 32 integrally formed on the crown prototype 2, it has an inner tube diameter with a certain depth. The front fork section 32 is used for being assembled with a bicycle frame and a handlebar. Thereby an integrally forged suspension front fork 3 is obtained.

However, during manufacturing processes of the suspension front fork 3, an order of the milling and the reaming of the steps S4, S5 after the deep drawing of the step S3 can be changed according to users' requirements. The suspension front fork 3 produced by the above manufacturing method using molding includes the two lateral shoulders 21, the front fork section 32 integrally formed between the two lateral shoulders 21, and the suspension tube sections 31 integrally formed on the bottom of the lateral shoulders 21. The open end of the suspension tube section 31 is provided with a widened section 312 whose inner and outer diameters are larger than those of the suspension tube section 31. The top surface of the lateral shoulder 21 is provided with the assembly hole 311 communicating with the suspension tube section 31. Thereby base material 1, the aluminum ingot, is treated by a series of processing operations and the suspension front fork 3 with the suspension tube sections 31 and the front fork section 32 is integrally formed. When an external force is applied to and making an impact on a front wheel of the bike, the suspension front fork 3 is having high strength and shock resistance.

According to the above embodiments, the present bike suspension form has the following advantages compared with the structure available now.

1. After a series of processing operations on the aluminum ingot, the integrally forged suspension front fork composed the suspension tube sections and the front fork section is obtained. The suspension front fork with high strength is shock resistant while an external force being applied to and having an impact on the front wheel of the bike.

2. The processing cost and assembly time for multiple tubes are saved by integrally forging of the suspension fork and thus the present method is cost effective.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method of manufacturing an integrally forged bike suspension fork comprising the steps of:

S1: providing a base material by selecting an aluminum ingot defining the base material;

S2: initially forming a crown prototype by forging the aluminum ingot, the crown prototype of the forged aluminum ingot includes two lateral shoulders, a solid protuberant base located between the two lateral shoulders and extending upward, and a concave portion on a bottom surface between the two lateral shoulders;

S20: performing reinforcement processing being performed on the concave portion between the two lateral shoulders to form a reinforcement rib on the concave portion by forging; and, S3: performing deep drawing wherein the two lateral shoulders and the solid protuberant base are processed by deep drawing at the same time, wherein the bottom surfaces of the two lateral shoulders are drawn down vertically and extended to form suspension tube sections at the same time and a top end of the solid protuberant base is drawn upward vertically and extended to form a front fork section whereby the integrally forged bike suspension fork is obtained.

2. The method as claimed in claim 1, wherein after the step S3, the method further includes a step S4 of milling a top surface of each of the two lateral shoulders corresponding to the suspension tube sections are milled to get assembly holes and the assembly holes are communicating with the suspension tube sections for mounting dampers.

3. The method as claimed in claim 1, wherein after the step S3, the method further includes a step S5 performing reaming on an upper open end of the suspension tube sections for increasing a tube diameter and convenient mounting of dampers.

4. An integrally forged bike suspension fork manufactured by the method as claimed in claim 2 comprising two lateral shoulders, a front fork section integrally formed between the two lateral shoulders, a suspension tube section integrally formed on a bottom of each of the lateral shoulders, wherein an assembly hole communicating with the suspension tube section is provided on a top surface of each of the lateral shoulders and a reinforcement rib is provided on the two lateral shoulders corresponding to the two suspension tube sections.

5. The integrally forged bike suspension fork as claimed in claim 4, wherein a lower open end of the suspension tube section is provided with a widened section whose inner and outer diameters are larger than inner and outer diameters of the suspension tube section.

* * * * *